(12) United States Patent
Leon Guerrero et al.

(10) Patent No.: US 10,131,211 B1
(45) Date of Patent: Nov. 20, 2018

(54) WINDSHIELD CONTAMINANT REDUCING ASSEMBLY AND METHOD

(71) Applicant: Ford Global Technologies, LLC, Dearborn, MI (US)

(72) Inventors: Miguel Angel Leon Guerrero, Ecatepec de Morelos (MX); Virginia Ortega Conde, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/649,727

(22) Filed: Jul. 14, 2017

(51) Int. Cl.
  *B62D 35/00* (2006.01)
  *B60J 1/20* (2006.01)
  *F15D 1/00* (2006.01)

(52) U.S. Cl.
  CPC .......... *B60J 1/2005* (2013.01); *B62D 35/005* (2013.01); *F15D 1/004* (2013.01); *F15D 1/008* (2013.01)

(58) Field of Classification Search
  CPC ...... B62D 35/005; B60J 1/2005; F15D 1/004; F15D 1/008; F15D 1/0075
  USPC .................................................. 296/91, 96.15
  See application file for complete search history.

(56) References Cited

U.S. PATENT DOCUMENTS

| | | | | |
|---|---|---|---|---|
| 1,932,798 A | * | 10/1933 | Millard ..................... | B60S 1/54 237/12.3 R |
| 2,187,281 A | * | 1/1940 | Pagliaroni ................ | B60H 1/28 454/123 |
| 2,236,846 A | * | 4/1941 | Davisson ............... | B60J 1/2005 296/91 |
| 2,697,490 A | | 12/1954 | Taber | |
| 2,926,396 A | * | 3/1960 | Hess ........................ | B60S 1/54 454/123 |

(Continued)

FOREIGN PATENT DOCUMENTS

| | | |
|---|---|---|
| DE | 102012007735 | 11/2012 |
| DE | 102014002886 | 9/2014 |
| DE | 202014006065 | 10/2015 |

OTHER PUBLICATIONS

Jilesen, J., Spruss, I., Kuthada, T., Wiedemann, J. et al., "Advances in Modelling A-Pillar Water Overflow," SAE Technical Paper 2015-1-1549, 2015, doi:10.4271/2015-01-1549.

(Continued)

*Primary Examiner* — Gregory A Blankenship
(74) *Attorney, Agent, or Firm* — Carlson, Gaskey & Olds, P.C.

(57) ABSTRACT

An exemplary contaminant reducing assembly includes, among other things, an aerodynamic wing positioned directly in front of a windshield relative to a direction of flow over the windshield. The aerodynamic wing is configured to influence the flow of air over the windshield. The aerodynamic wing, in some examples, can move back and forth between a retracted position and a deployed position to influence the flow. In some examples, the windshield is coated with a hydrophobic coating, which can further facilitate contaminant reduction. An exemplary contaminant reducing method includes, among other things, influence a flow of air over a windshield using an aerodynamic wing positioned directly in front of the windshield relative to a direction of the flow. The method, in some examples, can include moving the aerodynamic wing from a retracted position to a deployed position to influence the flow.

17 Claims, 4 Drawing Sheets

(56) References Cited

U.S. PATENT DOCUMENTS

| | | | | |
|---|---|---|---|---|
| 3,574,392 | A | * | 4/1971 | Hirano .................... B60J 1/2005 296/91 |
| 4,040,656 | A | * | 8/1977 | Clenet ..................... B60J 1/2005 296/91 |
| 4,229,035 | A | | 10/1980 | Newman |
| 4,928,580 | A | * | 5/1990 | McIntyre .............. B60R 1/0602 454/123 |
| 5,486,139 | A | * | 1/1996 | Papp ..................... B60S 1/0405 15/313 |
| 5,504,966 | A | * | 4/1996 | Lee ....................... B60S 1/0405 15/250.16 |
| 5,630,640 | A | * | 5/1997 | Fior ........................... B60J 7/22 296/91 |
| 5,852,846 | A | * | 12/1998 | Gonzalez .................. B60S 1/54 15/313 |
| 6,249,931 | B1 | | 6/2001 | Sato |
| 7,011,353 | B2 | | 3/2006 | Walker |
| 7,080,872 | B1 | | 7/2006 | Simonowits |
| 7,555,807 | B1 | * | 7/2009 | Mastandrea ............ B60S 1/528 15/250.01 |
| 9,399,493 | B1 | * | 7/2016 | Milde, Jr. ............... B62D 25/12 |
| 2004/0026953 | A1 | * | 2/2004 | Neel ....................... B60J 1/2002 296/91 |
| 2004/0202872 | A1 | * | 10/2004 | Fang ....................... C03C 17/30 428/447 |

OTHER PUBLICATIONS

Dasarathan, D., Jilesen, J., Croteau, D., and Ayala, R., "CFD Water Management Design for a Passenger Coach with Correlation," SAE Technical Paper 2016-01-8155, 2016, doi:10.4271/2016-01-8155.

Hagemeier, Thomas, Hartmann, Michael, and Dominique Thevenin, Practice of vehicle soiling investigations: A review, International Journal of Multiphase Flow, 2011, p. 860-875, vol. 37.

Foucart, Herve and Eric Blain, Water-flow Simulation on Vehicle Panels by Taking into Account the Calculated Aerodynamic Field, SAE Technical Paper, 2005, Commercial Vehicle Engineering Congress and Exhibition, Chicago, Ilinois.

Gaylard, A., Fagg, M., Bannister, M., Duncan, B. et al., "Modelling A-Pillar Water Overflow: Developing CFD and Experimental Methods," SAE Int. J. Passeng. Cars—Mech. Syst. 5(2):2012, doi:10.4271/2012-01-0588.

S. A. A. Abdul Ghani and A. Aroussi, E. Rice, Analysis of Factors Affecting Rainwater Ingestion into Vehicles HVAC Systems, SAE Technical Paper, 2001, SAE 2001 World Congress, Detroit, Michigan.

Karbon, Kenneth J., and Stephen E. Longman, Automobile Exterior Water Flow Analysis Using CFD and Wind Tunnel Visualization, SAE Technical Paper, 1998, Reprinted From: Developments in Vehicle Aerodynamics (SP-1318), International Congress and Exposition, Detroit, Michigan.

* cited by examiner

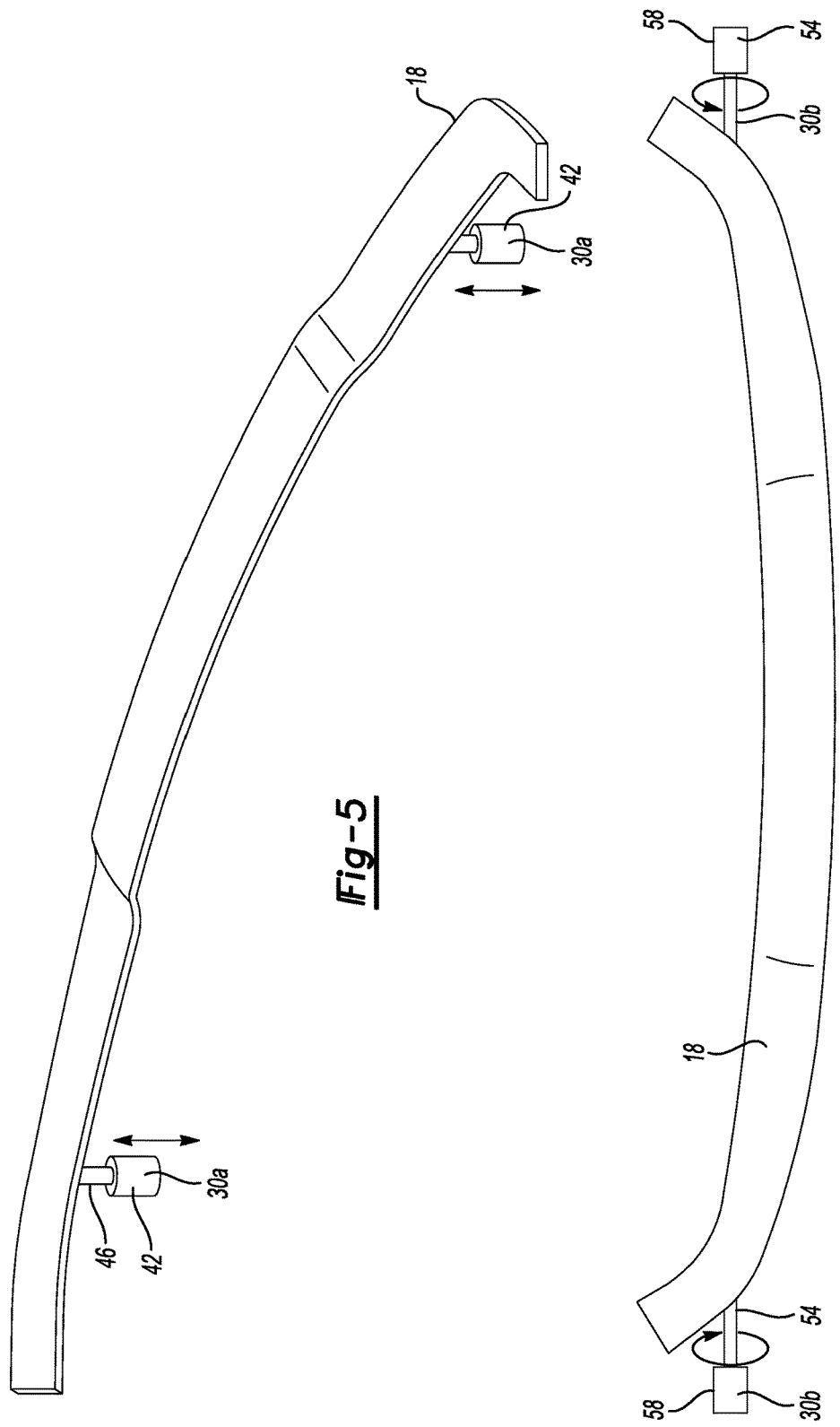

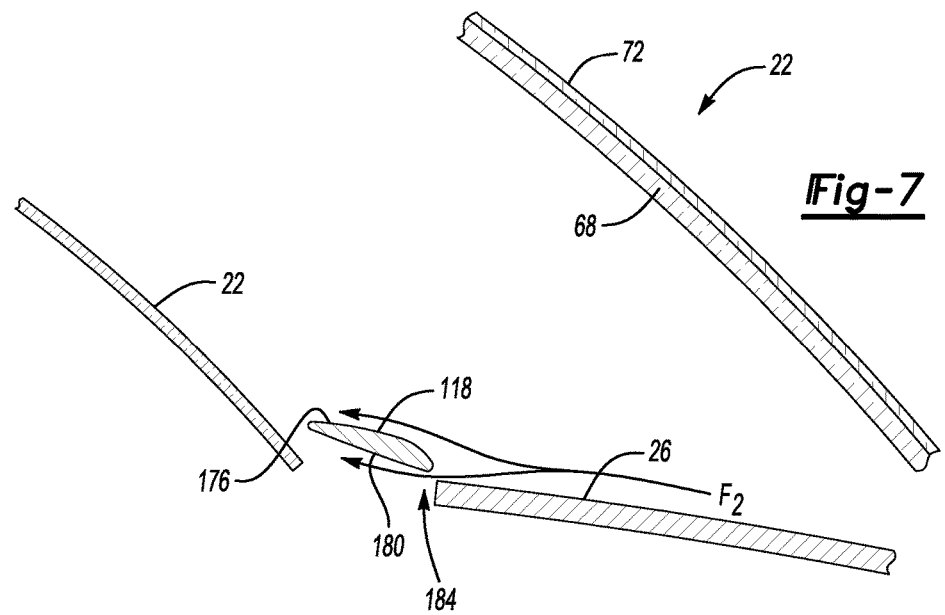
_Fig-7_
_Fig-8_
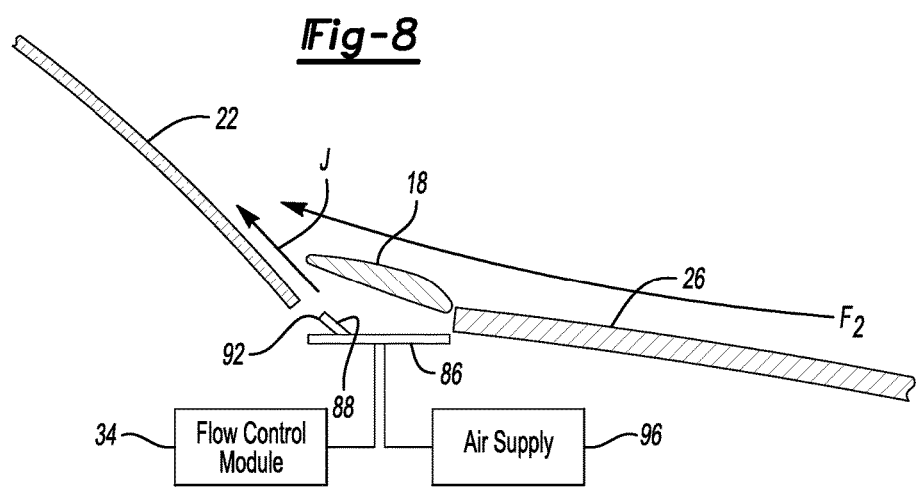
_Fig-9_
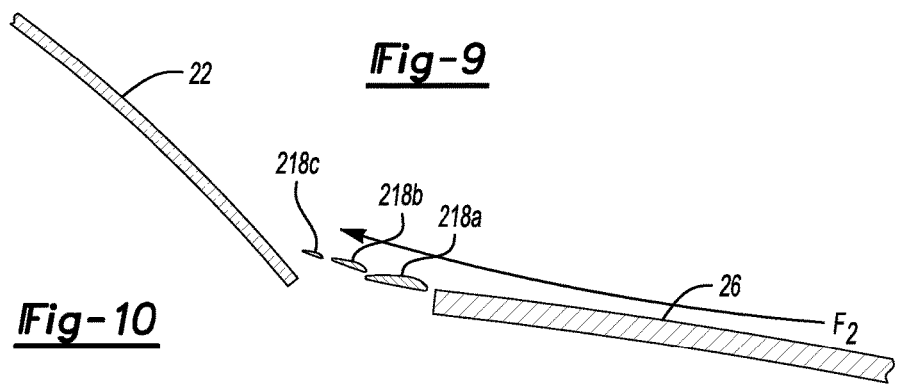
_Fig-10_

WINDSHIELD CONTAMINANT REDUCING ASSEMBLY AND METHOD

TECHNICAL FIELD

This disclosure relates generally to reducing contaminants on a windshield of a vehicle, and, in particular, to reducing contaminants by diverting flow over the windshield using an aerodynamic wing.

BACKGROUND

Contaminants can be carried toward a windshield of a vehicle by a flow of air as the vehicle is driven. Some of the contaminants may be deposited on the windshield. Contaminants deposited on the windshield can negatively impact visibility through the windshield, especially in low light conditions. Exemplary contaminants can include liquid water, windshield washer fluid, insects, snow, dust, etc.

Many vehicles incorporate wiper blades that can be actuated to remove contaminants from the windshield. Often, contaminants can remain even after the wiper blades have been actuated.

SUMMARY

A contaminant reducing assembly according to an exemplary aspect of the present disclosure includes, among other things, an aerodynamic wing positioned directly in front of a windshield relative to a direction of flow over the windshield. The aerodynamic wing is configured to influence a flow of air over the windshield.

In a further non-limiting embodiment of the foregoing assembly, the aerodynamic wing is configured to move back and forth between a retracted position and a deployed position to influence the flow of air over the windshield.

A further non-limiting embodiment of any of the foregoing assemblies includes at least one actuator that extends or retracts to move the aerodynamic wing from the retracted position to the deployed position.

A further non-limiting embodiment of any of the foregoing assemblies includes at least one actuator that rotates to move the aerodynamic wing from the retracted position to the deployed position.

A further non-limiting embodiment of any of the foregoing assemblies includes the windshield, and the windshield includes a hydrophobic coating.

A further non-limiting embodiment of any of the foregoing assemblies includes a blower beneath the aerodynamic wing. The blower is configured to selectively direct a stream of air toward the windshield.

A further non-limiting embodiment of any of the foregoing assemblies includes at least one nozzle of the blower. The aerodynamic wing is configured to move back and forth between a retracted position and a deployed position to influence the flow of air over the windshield. The nozzle has a flow discharging outlet that is vertically beneath the aerodynamic wing when the aerodynamic wing is in the deployed position.

A further non-limiting embodiment of any of the foregoing assemblies includes an outwardly facing surface of the aerodynamic wing and an inwardly facing surface of the aerodynamic wing. The outwardly facing surface has a convex profile.

In a further non-limiting embodiment of any of the foregoing assemblies, the outwardly facing surface has an airfoil profile.

In a further non-limiting embodiment of any of the foregoing assemblies, the inwardly facing surface has an airfoil profile such that the aerodynamic wing is an airfoil.

In a further non-limiting embodiment of any of the foregoing assemblies, the aerodynamic wing is configured to move back and forth between a retracted position and a deployed position to influence the flow of air over the windshield, and both the outwardly facing surface and the inwardly facing surface are configured to influence the flow of air over the windshield such that some of the flow of air moves both above and beneath the aerodynamic wing when the aerodynamic wing is in the deployed position.

In a further non-limiting embodiment of any of the foregoing assemblies, the aerodynamic wing is a first aerodynamic wing, and the assembly further includes at least one second aerodynamic wing configured to selectively retract and deploy to influence the flow of air over the windshield.

In a further non-limiting embodiment of any of the foregoing assemblies, the aerodynamic wing is disposed between the windshield and a front hood of a vehicle.

A contaminant reducing method according to an exemplary aspect of the present disclosure includes, among other things, influencing a flow of air over a windshield with an aerodynamic wing positioned directly in front of the windshield relative to a direction of the flow.

A further non-limiting embodiment of the foregoing method includes moving an aerodynamic wing from a retracted position to a deployed position to influence the flow.

A further non-limiting embodiment of any of the foregoing methods includes moving a portion of the flow of air over an inwardly facing surface of the aerodynamic wing in the deployed position prior to the flow moving over the windshield such that some of the flow moves both above and below the aerodynamic wing.

A further non-limiting embodiment of any of the foregoing methods includes rotating the aerodynamic wing to move the aerodynamic wing from the retracted position to the deployed position, and from the deployed position to the retracted position. The rotating is about a longitudinal axis of the aerodynamic wing.

A further non-limiting embodiment of any of the foregoing methods includes using a profile of an outwardly facing surface of the aerodynamic wing to generate a downforce on a vehicle when moving the flow of air over the outwardly facing surface.

In a further non-limiting embodiment of any of the foregoing methods, the profile is a convex profile.

A further non-limiting embodiment of the foregoing methods includes discharging a flow of air from an outlet positioned vertically beneath the aerodynamic wing to further influence the flow of air.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 illustrates a perspective view of the aerodynamic wing with an actuator assembly according to an exemplary embodiment.

FIG. 6 illustrates a top view of the aerodynamic wing with an actuator assembly according to another exemplary embodiment.

FIG. 7 illustrates a section view of through a portion of the windshield from the vehicle of FIGS. 1 and 3.

FIG. 8 illustrates a section view of a deployed aerodynamic wing and surrounding areas of a vehicle according to another exemplary embodiment.

FIG. 9 illustrates a section view of a deployed aerodynamic wing and surrounding areas of a vehicle according to yet another exemplary embodiment.

FIG. 10 illustrates a section view of a deployed aerodynamic wing and surrounding areas of a vehicle according to still another exemplary embodiment.

DETAILED DESCRIPTION

Figure 1:
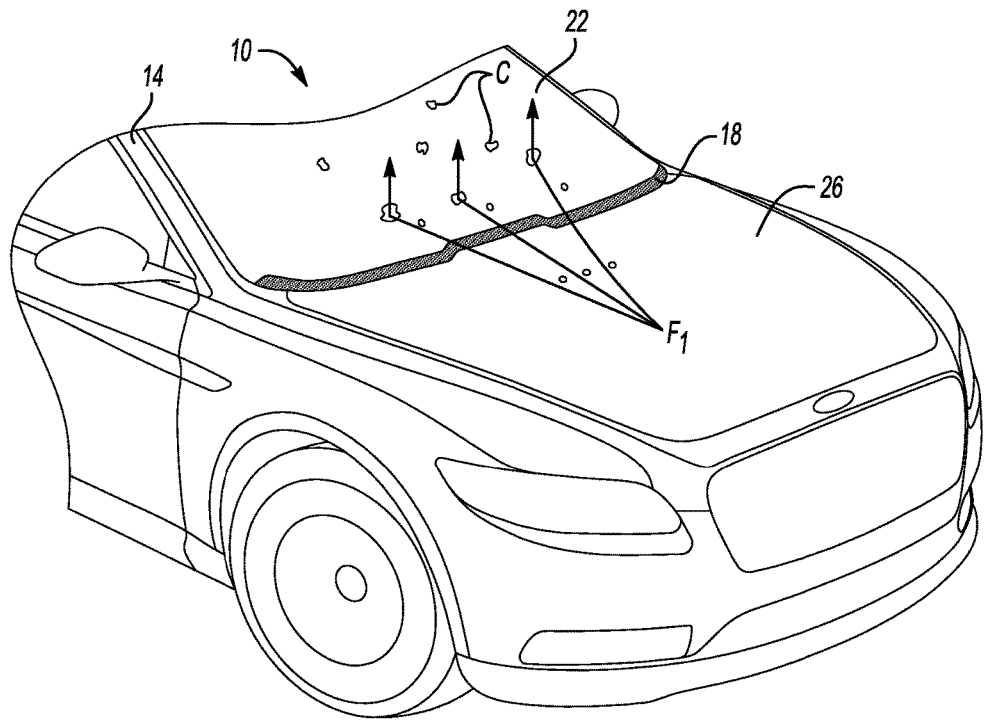
FIG. 1 shows a front of a vehicle incorporating an aerodynamic wing in a retracted position according to an exemplary embodiment of the present disclosure.

This disclosure relates generally to an aerodynamic wing that influences a flow of air over the windshield. The influencing of the flow over the windshield can direct contaminants carried within the flow of air away from the windshield, which can prevent those contaminants from being deposited upon the windshield. Contaminants deposited on the windshield can impact visibility through the windshield.

Referring to FIGS. 1-4, a front 10 of an exemplary of a vehicle 14 includes an aerodynamic wing 18 directly in front of a windshield 22. In this example, the aerodynamic wing 18 is positioned between the windshield 22 and a front hood 26 of the vehicle 14. This area of the vehicle 14 could additionally include wiper blades (not shown).

The exemplary aerodynamic wing 18 has, for a given cross section through the aerodynamic wing 18, a chord length that is less than a distance between the windshield 22 and the front hood 26 while providing enough space for the front hood 26 to open. The exemplary aerodynamic wing 18 has a longitudinal length that is less than a cross-car width of the windshield 22, and less than a cross-car width of the front hood 26. The longitudinal ends of the aerodynamic wing 18 can be swept toward a rear of the vehicle 14 to match a curved profile of the aft end of the front hood 26, the forward end of the windshield 22, or both.

The vehicle 14 includes an actuator assembly 30 and a flow control module 34. In response to a command from the flow control module 34, the actuator assembly 30 can move the aerodynamic wing 18 from a retracted position shown in FIGS. 1 and 2, to a deployed position shown in FIGS. 3 and 4.

In another exemplary embodiment, the actuator assembly 30 is omitted and the aerodynamic wing 18 is not moveable between a deployed and a retracted position. In such examples, the aerodynamic wing 18 is a passive aerodynamic wing that does not deploy or retract.

As the vehicle 14 is driven, a flow of air moves relative to the vehicle 14 across the front hood 26, across the aerodynamic wing 18, and then over the windshield 22. As can be appreciated, the flow can carry contaminants C, such as, for example, liquid water, ice, snow, dust, windshield washer fluid, and insects.

Figure 2:
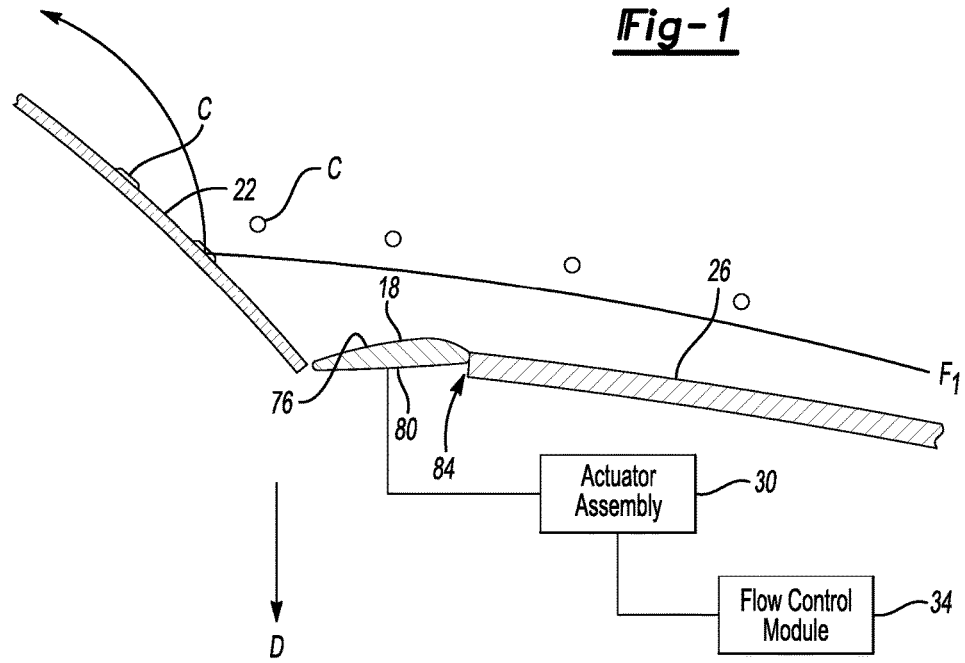
FIG. 2 illustrates a schematic cross-section of the aerodynamic wing of FIG. 1 and surrounding areas of the vehicle.

The aerodynamic wing 18 is configured to move back and forth between the retracted position and the deployed position to influence the flow moving over at least the windshield 22. That is, a flow $F_1$ over the windshield 22 when the aerodynamic wing 18 is in the retracted position of FIGS. 1 and 2 is different than a flow $F_2$ over the windshield 22 when the aerodynamic wing 18 is in the deployed position of FIGS. 3 and 4. Moving the aerodynamic wing 18 to the deployed position can change an intensity of the flow over the windshield 22, change the way the flow is deflected over the windshield 22, etc. In some examples, the deployed position may not be a fully deployed position of the aerodynamic wing 18. That is, the aerodynamic wing 18 can be actuated to positions between a fully deployed and fully retracted position.

Notably, the flow $F_1$ is more likely to result in contaminants C being deposited on the windshield 22 than the flow $F_2$. The aerodynamic wing 18 can be moved to a deployed position to change the flow $F_1$ to the flow $F_2$. In so doing, the flow is less likely to result in contaminants C being deposited on the windshield 22. The aerodynamic wing 18 in the deployed position channels the flow $F_2$ over the windshield 22 and along the side glass windows and side mirrors of the vehicle 14. In this example, the aerodynamic wing 18 in the deployed position increases a velocity of the flow $F_2$ relative to the flow $F_1$ over a dynamic boundary layer of the windshield 22.

The aerodynamic wing 18 helps to close at least some of a gap between the windshield 22 and an aft end of the front hood 26, which can improve aerodynamic performance of the vehicle 14 when the aerodynamic wing 18 is in the deployed position or the retracted position. In some examples, a leading edge of the aerodynamic wing 18 could overlap with a rear area of the front hood 26.

In some examples, the flow control module 34 maintains the aerodynamic wing 18 in the retracted position of FIGS. 1 and 2 when the vehicle 14 is driven at relatively low speeds, say below a threshold vehicle speed. The flow control module 34 then causes the aerodynamic wing 18 to move to the deployed position of FIGS. 3 and 4 in response to the flow control module 34 detecting a speed of the vehicle 14 at or above the threshold vehicle speed.

The flow control module 34 can be equipped with executable instructions for interfacing with, and commanding operation of, the aerodynamic wing 18 and the various components associated with the aerodynamic wing 18. The flow control module 34 can include a processing unit and non-transitory memory for executing the various control strategies and modes of the aerodynamic wing 18. The processing unit, in an embodiment, is configured to execute one or more programs stored in the memory of the flow control module 34.

A first exemplary program, when executed, may determine when and how to deploy the aerodynamic wing 18, such as in response to the vehicle 14 exceeding the threshold vehicle speed. The flow control module 34 could also control various other functions associated with the aerodynamic wing 18, such as an angle of deployment.

The actuator assembly 30 that moves the aerodynamic wing 18 back and forth between the retracted and deployed positions can have many configurations. In the exemplary embodiment of FIG. 5, the aerodynamic wing 18 is moved back and forth between the retracted and deployed positions by an actuator assembly 30a that comprises a pair of piston assemblies 42.

The piston assemblies 42 extend and retract a rod 46 to move the aerodynamic wing 18 back and forth between the retracted position and the deployed position. In this example, the rods 46 are extended by the piston assemblies 42 to move the aerodynamic wing 18 to the deployed position, and the rods 46 are retracted by the piston assemblies 42 to move the aerodynamic wing 18 to the retracted position. One end of the rods 46 is coupled directly to the aerodynamic wing 18, and an opposing end of the rod 46 is received within a respective cylinder 50 of the piston assemblies 42. The piston assemblies 42 can be pneumatic or hydraulically actuated piston assemblies 42.

In another exemplary actuator assembly 30b shown in FIG. 6, a rod 54 is rotated to move the aerodynamic wing 18 back and forth between the retracted position and the deployed position. The rods 54 are rotated by respective mechanisms 58. In this exemplary non-limiting embodiment, one end of the rods 54 is coupled directly to the aerodynamic wing 18 and opposing ends of the rods 54 are coupled directly to the mechanisms 58.

Referring now to FIG. 7 with continuing reference to FIGS. 1-4, the example windshield 22 includes a first layer 68 and a second layer 72. The first layer 68 is substantially glass. The second layer 72 is a transparent, hydrophobic film. Exemplary hydrophobic films can include those hydrophobic films sold under the trade names of Rain-X® and Aquapel®. While not required, the second layer 72 can be used in connection with the aerodynamic wing 18 to facilitate reducing of contamination buildup on the windshield 22.

The second layer 72 can facilitate dispersion of, among other things, contaminants C, such as liquid water that contacts the windshield 22. The second layer 72 can break up the liquid water into smaller droplets that are more easily moved away from the vehicle 14 within the flow of air moving over the windshield 22. The second layer 72 acts as a moisture repellent, which causes rain and other moisture to bead up into the smaller droplets.

Referring again to FIGS. 2 and 4, the exemplary aerodynamic wing 18 includes an outwardly facing surface 76 and an inwardly facing surface 80. Outward and inwardly, for purposes of this disclosure, are with respect to the vehicle 14. That is, the inwardly facing surface 80 faces back toward the windshield 22 and an engine compartment beneath the front hood 26, whereas the outwardly facing surface 76 faces away from the windshield 22 and the front hood 26.

Notably, the outwardly facing surface 76 has a convex profile, which can facilitate flow over the aerodynamic wing 18. The convex profile of the outwardly facing surface 76 can, among other things, reduce a propensity for vortices in the flow aft of the aerodynamic wing 18. Such vortices can result in, among other things, unwanted drag.

More specifically, in this example embodiment, the outwardly facing surface 76 has an airfoil profile.

Figure 4:
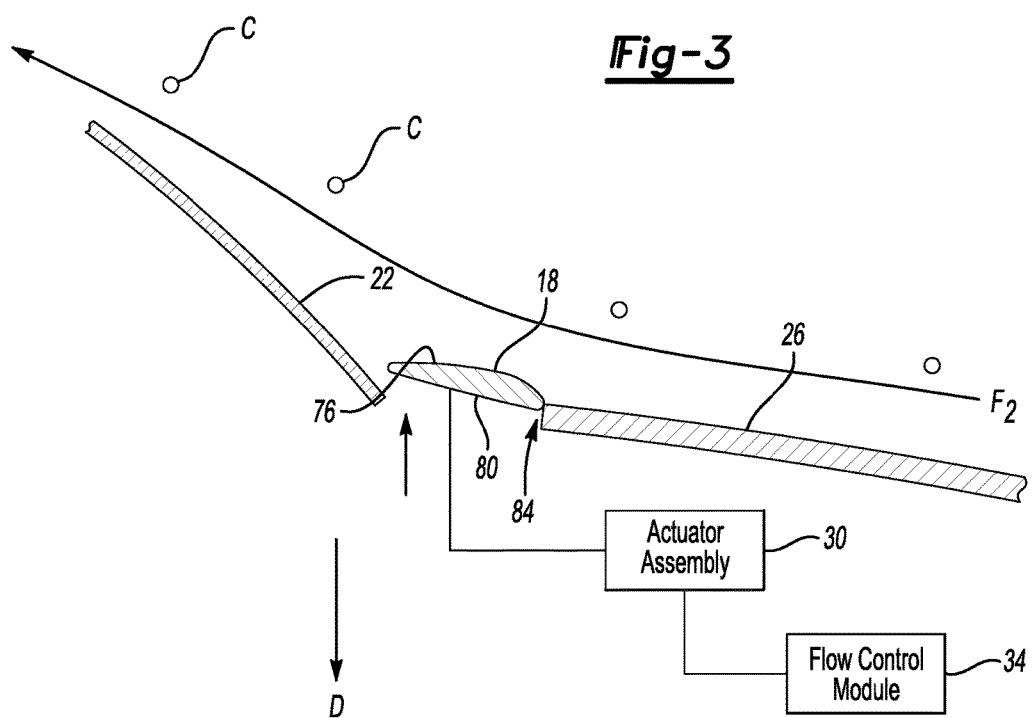
FIG. 4 illustrates a schematic cross-section view of the aerodynamic wing of FIG. 3 and surrounding areas of the vehicle.

In the exemplary embodiment of FIGS. 2 and 4, a leading edge of the aerodynamic wing 18 is configured to be positioned directly adjacent an aft portion of the front hood 26, at position 84, when the aerodynamic wing 18 is in the retracted position and when the aerodynamic wing 18 is in the deployed position. This relationship substantially prevents the flow $F_1$ and the flow $F_2$ from moving over the inwardly facing surface 80 of the aerodynamic wing 18.

Figure 3:
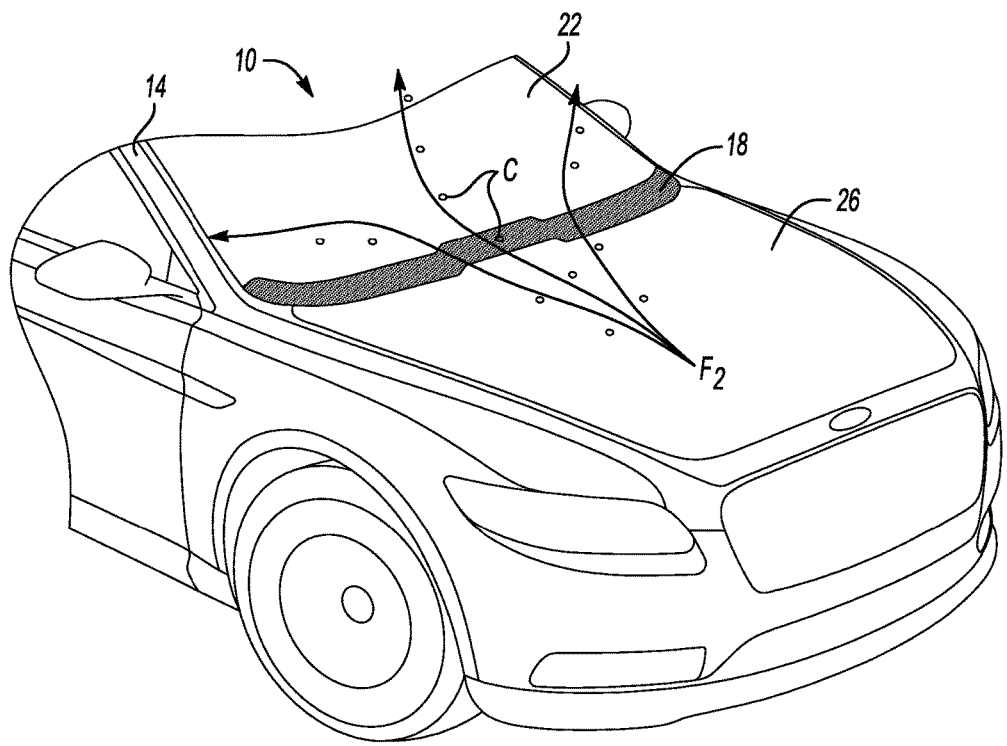
FIG. 3 illustrates the front of the vehicle of FIG. 1 with the aerodynamic wing in a deployed position.

Notably, the airfoil profile of the aerodynamic wing 18 can provide other benefits beyond simply reducing vortices at an aft end of the aerodynamic wing 18. For example, the airfoil profile can generate a downforce D to the vehicle 14 (FIGS. 1 and 3). The downforce D can provide additional traction during driving. The downforce D is advantageously applied vertically above the front wheels of the vehicle 14, which can enhance traction between the front wheels and a road surface.

In some examples, the inwardly facing surface 80 could additionally have an airfoil profile, such that the aerodynamic wing 18 is an airfoil. For example, referring to FIG. 8, another exemplary aerodynamic wing 118 is configured such that a leading edge of the aerodynamic wing 118 is spaced a distance from an aft of the front hood 26 at area 184 when the aerodynamic wing 118 is in the deployed position. This spacing permits flow $F_2$ to move over both an outwardly facing surface 176 and an inwardly facing surface 180 of the aerodynamic wing 118 when the aerodynamic wing 118 is in the deployed position.

Referring now to FIG. 9, the aerodynamic wing 18, or any of the other aerodynamic wings of this disclosure, could be used in connection with a blower 86. The blower 86 includes at least one nozzle 88 with a flow discharging outlet 92. In some examples, the blower 86 includes a plurality of nozzles 88 distributed along the underside of the aerodynamic wing 18 across the width of the vehicle 14. In another example, the at least one nozzle 88 could be incorporated within the aerodynamic wing 18, such as by being recessed within a channel of the aerodynamic wing 18.

The flow control module 34 can be operably connected to the blower 86. In response to a command from the flow control module 34, the blower 86 can direct a jet J of air through the at least one nozzle 88 from the flow discharging outlet 92. The jet J may include air moving perpendicularly to a surface of the windshield 22. An air supply 96 within the vehicle can provide the air to the blower 86. The air supply 96 could be part of an air conditioning system for the vehicle 14.

The jet J of air from the flow discharging outlet 92 can reduce a propensity for vortices within the flow $F_2$ as the flow $F_2$ moves over an aft end of the aerodynamic wing 18. Notably, the flow discharging outlet 92 is positioned vertically beneath a portion of the aerodynamic wing 18 such that the jet J originates from an area forward from the aft end of the aerodynamic wing 18. This positioning has been found to more effectively reduce vortices in the flow $F_2$ than, for example, a jet of air originating from a position that is rearward an aft end of from the aerodynamic wing 18.

In some examples, the jet J of air can be used to heat or cool a passenger compartment of the vehicle 14. For example, if heating the passenger compartment is desired, the jet J of air could be heated by a heater prior to moving through the flow discharging outlet 92. The jet J then provides a jet curtain of heated air that heats the passenger compartment. If cooling the passenger compartment is desired, the jet J of air could be cooled by a cooler prior to moving through the flow discharging outlet 92.

Referring now to FIG. 10, yet another example aerodynamic wing 218a is part of an aerodynamic wing assembly including a plurality of individual aerodynamic wings. In this example, the aerodynamic wing 218a is positioned in front of a second aerodynamic wing 218b, which is positioned in front of a third aerodynamic wing 218c. In this exemplary embodiment, a cross-sectional area of the aerodynamic wing 218a is greater than the cross-sectional area of the aerodynamic wing 218b, which is greater than a cross-sectional area of the aerodynamic wing 218c.

The aerodynamic wing assembly can be actuated such that the aerodynamic wings 218a, 218b, and 218c, move together from respective retracted positions and deployed positions. Alternatively, the aerodynamic wings 218a, 218b, and 218c could be actuated individually. Utilizing the aerodynamic wing assembly with multiple individual aerodynamic wings 218a, 218b, and 218c can provide additional levels of control over the flow $F_2$.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Features of the disclosed examples include an aerodynamic wing that can be used to reduce contaminants on a vehicle windshield. The aerodynamic wing is, when compared to windshield wipers, relatively unobtrusive. The dimensions and design of the aerodynamic wing can be changed to optimize flow.

If the aerodynamic wing is passive such that it does not deploy or retract, the aerodynamic wing does not require actuator components, which can help to avoid maintenance costs associated with such components.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A contaminant reducing assembly, comprising:
an aerodynamic wing positioned directly in front of a windshield relative to a direction of flow over the windshield, the aerodynamic wing configured to influence a flow of air over the windshield, the aerodynamic wing including an outwardly facing surface and an inwardly facing surface, the outwardly facing surface having a convex profile.

2. The contaminant reducing assembly of claim 1, wherein the aerodynamic wing is configured to move back and forth between a retracted position and a deployed position to influence the flow of air over the windshield.

3. The contaminant reducing assembly of claim 2, further comprising at least one actuator that extends or retracts to move the aerodynamic wing from the retracted position to the deployed position.

4. The contaminant reducing assembly of claim 2, further comprising at least one actuator that rotates to move the aerodynamic wing from the retracted position to the deployed position.

5. The contaminant reducing assembly of claim 1, further comprising the windshield, wherein the windshield comprises a hydrophobic coating.

6. The contaminant reducing assembly of claim 1, further comprising a blower beneath the aerodynamic wing, the blower configured to selectively direct a stream of air toward the windshield.

7. The contaminant reducing assembly of claim 6, further comprising at least one nozzle of the blower, wherein the aerodynamic wing is configured to move back and forth between a retracted position and a deployed position to influence the flow of air over the windshield, wherein the at least one nozzle has a flow discharging outlet that is vertically beneath the aerodynamic wing when the aerodynamic wing is in the deployed position.

8. The contaminant reducing assembly of claim 1, wherein the outwardly facing surface has an airfoil profile.

9. The contaminant reducing assembly of claim 8, wherein the inwardly facing surface has an airfoil profile such that the aerodynamic wing is an airfoil.

10. The contaminant reducing assembly of claim 1, wherein the aerodynamic wing is configured to move back and forth between a retracted position and a deployed position to influence the flow of air over the windshield, wherein both the outwardly facing surface and the inwardly facing surface are configured to influence the flow of air over the windshield such that some of the flow of air moves both above and beneath the aerodynamic wing when the aerodynamic wing is in the deployed position.

11. The contaminant reducing assembly of claim 1, wherein the aerodynamic wing is disposed between the windshield and a front hood of a vehicle.

12. A contaminant reducing assembly, comprising:
a first aerodynamic wing positioned directly in front of a windshield relative to a direction of flow over the windshield, a first aerodynamic wing configured to influence a flow of air over the windshield; and
at least one second aerodynamic wing configured to selectively retract and a deploy to influence the flow of air over the windshield.

13. A contaminant reducing method, comprising:
influencing a flow of air over a windshield with an aerodynamic wing positioned directly in front of the windshield relative to a direction of the flow;
moving the aerodynamic wing from a retracted position to a deployed position; and
moving a portion of the flow of air over an inwardly facing surface of the aerodynamic wing in the deployed position prior to the flow moving over the windshield such that some of the flow moves both above and below the aerodynamic wing.

14. The contaminant reducing method of claim 13, further comprising rotating the aerodynamic wing to move the aerodynamic wing from the retracted position to the deployed position, and from the deployed position to the retracted position, wherein the rotating is about a longitudinal axis of the aerodynamic wing.

15. The contaminant reducing method of claim 13, further comprising using a profile of an outwardly facing surface of the aerodynamic wing to generate a downforce on a vehicle when moving the flow of air over the outwardly facing surface.

16. The contaminant reducing method of claim 15, wherein the profile is a convex profile.

17. The contaminant reducing method of claim 13, further comprising discharging a stream of air from an outlet positioned vertically beneath the aerodynamic wing to further influence the flow of air.

* * * * *

UNITED STATES PATENT AND TRADEMARK OFFICE
CERTIFICATE OF CORRECTION

| | | |
|---|---|---|
| PATENT NO. | : 10,131,211 B1 | Page 1 of 1 |
| APPLICATION NO. | : 15/649727 | |
| DATED | : November 20, 2018 | |
| INVENTOR(S) | : Leon Guerrero et al. | |

It is certified that error appears in the above-identified patent and that said Letters Patent is hereby corrected as shown below:

In the Claims

In Claim 12, Column 8, Line 26; replace "a deploy" with --deploy--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*